US012293696B2

(12) United States Patent
Kwon et al.

(10) Patent No.: US 12,293,696 B2
(45) Date of Patent: May 6, 2025

(54) DISPLAY DEVICE AND METHOD OF CONTROLLING THE SAME

(71) Applicant: LX SEMICON CO., LTD., Daejeon (KR)

(72) Inventors: You Jin Kwon, Daejeon (KR); A Reum Kim, Daejeon (KR); Jae Eun Lee, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 0 days.

(21) Appl. No.: 18/425,650

(22) Filed: Jan. 29, 2024

(65) Prior Publication Data

US 2024/0257701 A1 Aug. 1, 2024

(30) Foreign Application Priority Data

Jan. 30, 2023 (KR) ........................ 10-2023-0011395
Sep. 26, 2023 (KR) ........................ 10-2023-0129111

(51) Int. Cl.
*G09G 3/20* (2006.01)
*G09G 3/3208* (2016.01)

(52) U.S. Cl.
CPC ......... *G09G 3/2096* (2013.01); *G09G 3/3208* (2013.01); *G09G 2330/025* (2013.01); *G09G 2370/00* (2013.01)

(58) Field of Classification Search
CPC ............... G09G 3/2096; G09G 3/3208; G09G 2330/025; G09G 2370/00
See application file for complete search history.

(56) References Cited

U.S. PATENT DOCUMENTS

2002/0136241 A1 9/2002 Pasqualino et al.
2015/0062186 A1* 3/2015 Park .................... G09G 3/3233 345/87
2015/0116376 A1* 4/2015 Kimura ................ G09G 3/3406 345/102

FOREIGN PATENT DOCUMENTS

WO 2006095313 A1 9/2006

OTHER PUBLICATIONS

Extended European Search Report mailed on May 15, 2024, issued for the corresponding European patent application No. 24153597.0, 11 pages.

* cited by examiner

*Primary Examiner* — Robert J Michaud
(74) *Attorney, Agent, or Firm* — ROTHWELL, FIGG, ERNST & MANBECK, P.C.

(57) ABSTRACT

Disclosed is a method of controlling a display device, the method including generating a plurality of Average Picture Level (APL) data for each specific period within a vertical blank period by a first display module, transmitting a plurality of the APL data to a second display module at a specific timing point by the first display module, receiving a plurality of the APL data by the second display module, and processing image data by the second display module based on a specific APL data among a plurality of the received APL data.

22 Claims, 10 Drawing Sheets

(2-1)

| | | | | | |
|---|---|---|---|---|---|
| H Total | 4400 | Pixel | V Total | 2250 | H |
| H Active | 3840 | Pixel | V Active | 2160 | H |
| H Front P | 176 | Pixel | V Front P | 8 | H |
| HSync | 88 | Pixel | VSync | 10 | H |
| H Back P | 296 | Pixel | V Back P | 72 | H |

(2-2)

| Vblank(Low) | APL Data |
|---|---|
| 1 | 100 |
| 2 | 100 |
| 3 | 100 |
| 4 | 0 |
| 5 | 100 |
| 6 | 100 |
| 7 | 100 |
| 8 | 100 |
| 9 | 100 |
| 10 | 500 |
| 11 | 100 |
| 12 | 100 |
| 13 | 100 |
| 14 | 350 |
| 15 | 100 |
| 16 | 100 |
| 17 | 100 |
| 18 | 100 |
| 19 | 100 |
| 20 | 100 |
| Numerous Equivalence | 100 |

| Vblank(Low) | Normal |
|---|---|
| 1 | 100 |
| 2 | 100 |
| 3 | 100 |
| 4 | 100 |
| 5 | 120 |
| 6 | 100 |
| 7 | 100 |
| 8 | 50 |
| 9 | 100 |
| 10 | 100 |
| 11 | 100 |
| 12 | 100 |
| 13 | 100 |
| 14 | 0 |
| 15 | 100 |
| 16 | 100 |
| 17 | 100 |
| 18 | 100 |
| 19 | 100 |
| 20 | 100 |
| Numerous Equivalence | 100 |

FIG. 7

| | Count | Normal | AbNormal_1 | AbNormal_2 | AbNormal_3 |
|---|---|---|---|---|---|
| | 1 | 100 | 100 | 100 | 100 |
| 710 | 2 | 100 | 0 | 100 | 100 |
| 720 | 3 | 100 | 0 | 100 | 100 |
| | 4 | 100 | 100 | 100 | 100 |
| | 5 | 120 | 120 | 120 | 120 |
| | 6 | 100 | 100 | 100 | 100 |
| 730 | 7 | 100 | 100 | 100 | 0 |
| | 8 | 100 | 100 | 100 | 100 |
| | 9 | 100 | 100 | 100 | 100 |
| | 10 | 100 | 100 | 100 | 100 |
| 740 | 11 | 100 | 100 | 100 | 400 |
| | 12 | 100 | 100 | 100 | 100 |
| | 13 | 100 | 100 | 100 | 100 |
| 750 | 14 | 100 | 100 | 100 | 300 |
| | 15 | 100 | 100 | 100 | 100 |
| 760 | 16 | 100 | 100 | 512 | 100 |
| 770 | 17 | 100 | 100 | 512 | 100 |
| | 18 | 100 | 100 | 100 | 100 |
| | 19 | 100 | 100 | 100 | 100 |
| | 20 | 100 | 100 | 100 | 100 |

FIG. 8

| Vblank(Low) | Normal | AbNormal_1 | AbNormal_2 | AbNormal_3 |
|---|---|---|---|---|
| 1 | 100 | 100 | 100 | 100 |
| 2 | 100 | 0 | 100 | 100 |
| 3 | 100 | 0 | 100 | 100 |
| 4 | 100 | 100 | 100 | 100 |
| 5 | 120 | 120 | 120 | 120 |
| 6 | 100 | 100 | 100 | 100 |
| 7 | 100 | 100 | 100 | 0 |
| 8 | 100 | 100 | 100 | 100 |
| 9 | 100 | 100 | 100 | 100 |
| 10 | 100 | 100 | 100 | 100 |
| 11 | 100 | 100 | 100 | 400 |
| 12 | 100 | 100 | 100 | 100 |
| 13 | 100 | 100 | 100 | 100 |
| 14 | 100 | 100 | 100 | 300 |
| 15 | 100 | 100 | 100 | 100 |
| 16 | 100 | 100 | 512 | 100 |
| 17 | 100 | 100 | 512 | 100 |
| 18 | 100 | 100 | 100 | 100 |
| 19 | 100 | 100 | 100 | 100 |
| 20 | 100 | 100 | 100 | 100 |
| Average | 100 | 90 | 141.2 | 120 |

810

(a)

| Vblank(Low) | Normal | AbNormal_1 | AbNormal_2 | AbNormal_3 |
|---|---|---|---|---|
| 1 | 100 | 100 | 100 | 100 |
| 2 | 100 | 0 | 100 | 100 |
| 3 | 100 | 0 | 100 | 100 |
| 4 | 100 | 100 | 100 | 100 |
| 5 | 120 | 120 | 120 | 120 |
| 6 | 100 | 100 | 100 | 100 |
| 7 | 100 | 100 | 100 | 0 |
| 8 | 100 | 100 | 100 | 100 |
| 9 | 100 | 100 | 100 | 100 |
| 10 | 100 | 100 | 100 | 100 |
| 11 | 100 | 100 | 100 | 400 |
| 12 | 100 | 100 | 100 | 100 |
| 13 | 100 | 100 | 100 | 100 |
| 14 | 100 | 100 | 100 | 300 |
| 15 | 100 | 100 | 100 | 100 |
| 16 | 100 | 100 | 512 | 100 |
| 17 | 100 | 100 | 512 | 100 |
| 18 | 100 | 100 | 100 | 100 |
| 19 | 100 | 100 | 100 | 100 |
| 20 | 100 | 100 | 100 | 100 |
| Numerous Equivalence | 100 | 100 | 100 | 100 |

820

(b)

DISPLAY DEVICE AND METHOD OF CONTROLLING THE SAME

This application claims the benefits and priority of Korean Patent Applications No. 10-2023-0011395 and No. 10-2023-0129111, filed on Jan. 30, 2023, and Sep. 26, 2023, respectively, which are hereby incorporated by references in their entirety as fully set forth herein.

BACKGROUND OF THE DISCLOSURE

Technical Field

The present disclosure relates to a display device, a main board, a timing controller board, etc., and more particularly, to a method of transmitting and receiving a video signal according to a serial interface system and an image processing device for implementing the same.

Background

An image processing device processes an image signal or data received from the outside according to various image processing processes. The image processing device may display the processed image data as an image on a display panel equipped with its own, or may output the image data processed to be displayed as an image on another display device equipped with a panel to the corresponding display device.

That is, when an image processing device is a device capable of processing image, it may pertain to both a case of having a panel capable of displaying an image and a case of failing to have the panel. The former case is specifically referred to as a display device, and examples thereof include a TV, a portable multimedia player, a tablet, a mobile phone, and the like, and examples of the latter case include a set-top box, a video player, and the like.

Image data is transmitted from a transmitting side to a receiving side by an interface of preset specifications. The transmitting side and the receiving side may be respectively devices or boards. An example of transmitting image data between the devices may include a case in which image data is outputted from an image processing device to a display device, and an example of transmitting image data between the boards may include a case of outputting image data from an image processing board to a timing controller board in a device.

As resolution of image data increases, the amount of image data to be transmitted per unit clock increases, and various transmission interface specifications have been proposed to meet such demands.

Low Voltage Differential Signaling (LVDS) refers to a digital interface for serial communication through two copper wires spaced apart from each other, for example.

LVDS uses a serial communication system. Serial communication refers to a communication system that transmits one bit per cycle. A transmitting node transmits two signals having one bit information per cycle to an LVDS interface. The receiving node recognizes information by one bit through a voltage difference between the two signals. Differential signaling refers to a difference between two signals. Communication robust to noise may be configured by transmitting data using the differential signaling.

However, as an image/video data bandwidth increases and a length of a signal transmission interface increases, the LVDS system has limitations.

V-by-One (Vx1) technology has recently been introduced to overcome the limitations of the LVDS system.

Vx1 technology adopts a clock-embedded system, which is a method of transmitting a data signal and clock information through a single signal line.

In LVDS, a data signal and a clock signal are transmitted through separate signal lines, which is called a data/clock separation transmission system. However, in the LVDS system, there is a problem that distortion between the data signal and the clock signal increases as a data transmission speed increases or a cable arrival distance increases. In addition, if the data and clock signal reception timing is delayed, there is a problem that data cannot be received properly as well.

On the other hand, in the clock embedded system, clock information is embedded in a serial data signal. Through this, clock information may be extracted by a Clock Data Recovery (CDR) circuit of a de-serializer, and a data signal may be synchronized with an embedded clock.

This method does not cause skew between the data signal and the clock signal even if the transmission speed or the transmission distance increases. Therefore, the Vx1 technology has the advantage of being able to transmit data at a higher speed through a relatively longer cable.

On the other hand, when using the Vx1 protocol, Average Picture Level APL calculation can be performed on a main board (also referred to as Main SoC), and the main board transfers an APL value to a T-CON (i.e., timing controller board).

In this case, the APL value is transferred using a control (CTL) data region in the Vx1 protocol.

On the other hand, an OLED panel uses a frame memory to calculate APL, and enables a screen to be driven in the form of frame memory less, so that the screen can be driven only with the APL data value transferred from a main board (Main SoC).

However, since data transmission by the Vx1 protocol according to the related art basically adopts a lossy structure, there is a possibility of error occurrence of a temporary APL data value when transmitting control data (CTL Data).

When an error occurs in APL data, serious problems of overcurrent and screen sparkle may be caused to an OLED panel driven by current.

SUMMARY

Accordingly, the present disclosure is directed to a display device and method of controlling the same that substantially obviate one or more problems due to limitations and disadvantages of the related art.

One object of the present disclosure devised to solve the above-mentioned problems is to provide a display device and method of controlling the same, which drastically reduce the possibility of errors for APL data in an interface inside the display device.

Another object of the present disclosure devised to solve the above-mentioned problems is to provide a display device and method of controlling the same, which provide a technology for a T-CON board to receive error-free control data (e.g., including APL values) from a main board even in the lossy structure of Vx1 protocol.

Further object of the present disclosure devised to solve the above-mentioned problems is to provide a display device and method of controlling the same, which provide a system capable of stably driving an OLED panel current with a parameter stably matched between an image and an APL on current driving of a panel.

To achieve these objects and other advantages and in accordance with the purpose of the disclosure, as embodied and broadly described herein, a method of controlling a display device according to one embodiment of the present disclosure is provided, the method including generating a plurality of Average Picture Level (APL) data for each specific period within a vertical blank period by a first display module, transmitting a plurality of the APL data to a second display module at a specific timing point by the first display module, receiving a plurality of the APL data by the second display module, and processing image data by the second display module based on a specific APL data among a plurality of the received APL data.

The specific period may include a case of satisfying all of a first condition that a vertical synchronization signal Vsync is in a low state, a second condition that a horizontal synchronization signal Hsync is in the low state, and a third condition that a data enable signal DE is in the low state.

The specific timing point may include a timing point at which the vertical synchronization signal Vsync rises.

The transmitting may include transmitting a plurality of the APL data once in a table format.

The processing may further include comparing a plurality of the received APL data and selecting the specific APL data with most numerous equivalence.

There is no limitation on the display device described in the present specification, and for example, it is applicable to devices conforming to the Vx1 (V-by-One) standard.

In another aspect, as embodied and broadly described herein, a first display module for processing image data according to one embodiment of the present disclosure may include an interface configured to connect to a second display module, a generator generating a plurality of Average Picture Level (APL) data for each specific period within a vertical blank period, and a controller controlling the interface to transmit a plurality of the APL data to a timing controller board at a specific timing point.

In further aspect, as embodied and broadly described herein, a second display module for processing image data according to one embodiment of the present disclosure may include an interface receiving a plurality of APL data from a first display module and a controller processing the image data based on a specific APL data among a plurality of the received APL data.

Accordingly, the present disclosure provides the following effects and/or advantages.

According to one embodiment of the present disclosure, in an interface inside a display device, a technical effect of drastically reducing the possibility of error in APL data is expected.

According to another embodiment of the present disclosure, a technology capable of receiving error-free control data (e.g., including APL value) from a main board even in a lossy structure of a Vx1 protocol is provided.

In addition, according to further embodiment of the present disclosure, provided is a system capable of stably driving OLED panel current with parameters that are stably matched between an image and an APL on current driving of a panel.

However, in addition to the above explicitly mentioned technical effects, the advantages that can be inferred through the entire purpose of the specification and drawings will naturally fall within the scope of the present disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIG. 7 is a diagram illustrating a problem when APL data is transmitted according to the related art;

FIG. 8 is a diagram illustrating a technical effect when APL data is transmitted according to one embodiment of the present disclosure;

DETAILED DESCRIPTION

Figure 1:
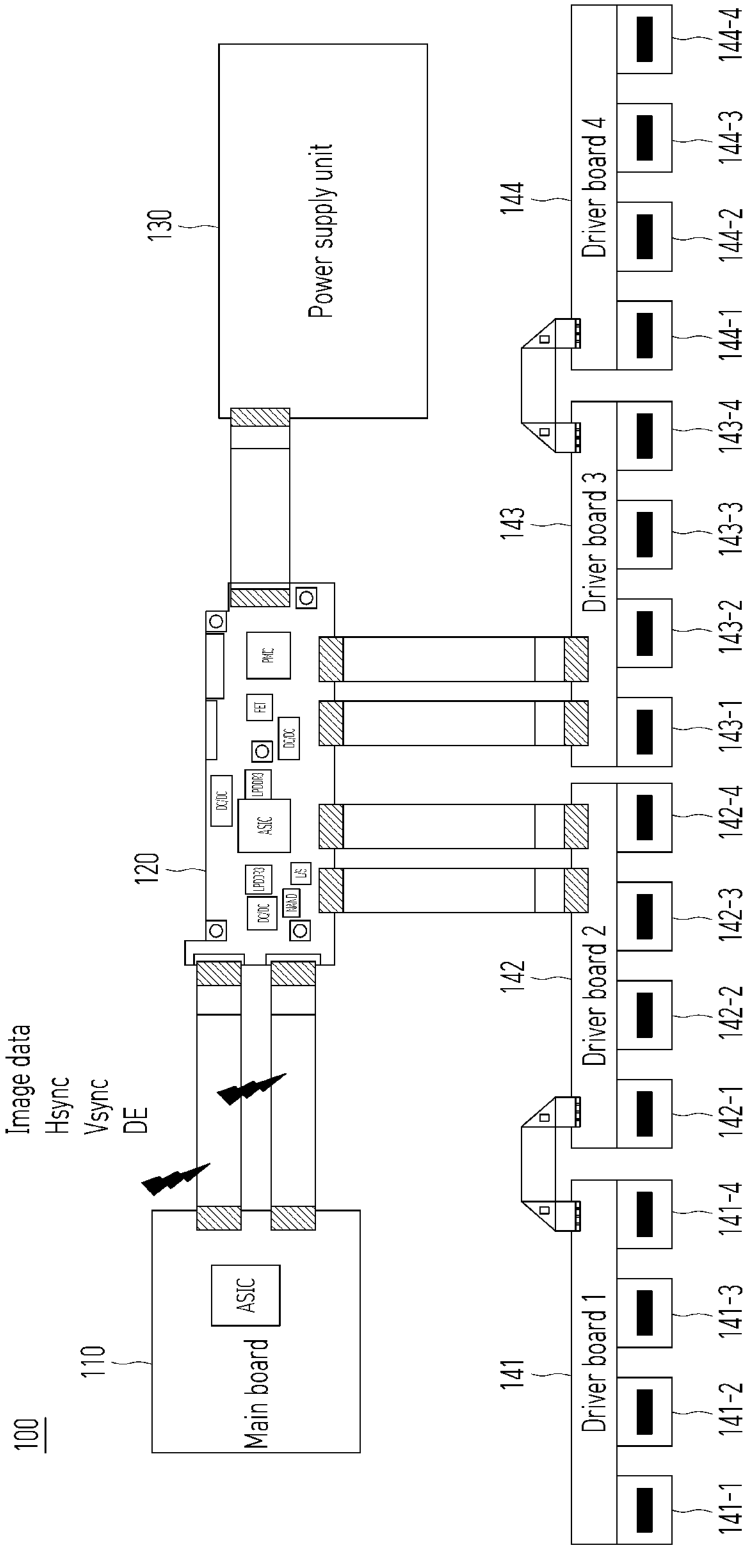
FIG. 1 is a detailed circuit diagram of an image processing device according to one aspect of the present disclosure.

Throughout the specification, like reference numerals are used to refer to substantially the same components. In the following description, detailed descriptions of components and features known in the art may be omitted if they are not relevant to the core configuration of the present disclosure. The meanings of terms used in this specification are to be understood as follows.

The advantages and features of the present disclosure, and methods of achieving them, will become apparent from the detailed description of the embodiments, together with the accompanying drawings. However, the present disclosure is not limited to the embodiments disclosed herein and will be implemented in many different forms. The embodiments are provided merely to make the disclosure of the present disclosure thorough and to fully inform one of those skilled in the art to which the present disclosure belongs of the scope of the disclosure. It is to be noted that the scope of the present disclosure is defined only by the claims.

The figures, dimensions, ratios, angles, numbers of elements given in the drawings are merely illustrative and are not limiting. Like reference numerals refer to like elements throughout the specification. Further, in describing the present disclosure, descriptions of well-known technologies may be omitted in order to avoid obscuring the gist of the present disclosure.

As used herein, the terms "includes," "has," "comprises," and the like should not be construed as being restricted to the means listed thereafter unless specifically stated otherwise. Where an indefinite or definite article is used when referring to a singular noun e.g. "a" or "an", "the", this includes a plural of that noun unless something else is specifically stated.

Elements are to be interpreted a margin of error, even if not explicitly stated otherwise.

In describing positional relationship, for example, if the positional relationship of two parts is described as 'on ~', 'over ~', 'under ~', 'next to ~', or the like, one or more other parts may be located between the two parts unless 'right' or 'direct' is used.

In describing temporal relationships, terms such as "after," "subsequent to," "next to," "before," and the like may include cases where any two events are not consecutive, unless the term "immediately" or "directly" is explicitly used.

While the terms first, second, and the like are used to describe various elements, the elements are not limited by these terms. These terms are used merely to distinguish one element from another. Accordingly, a first element referred to herein may be a second element within the technical idea of the present disclosure.

"X-axis direction", "Y-axis direction", and "Z-axis direction" should not be interpreted only as a geometrical relationship in which the relationship between each other is vertically formed, and may mean that the configuration of the present disclosure has a wider directionality within the range in which it may work functionally.

FIG. 1 is a detailed circuit diagram of an image processing device according to one aspect of the present disclosure. Hereinafter, a configuration of an image processing device according to one aspect of the present disclosure will be described with reference to FIG. 1.

An image processing device 100 may include a main board 110, a timing controller board 120, a power supply unit 130, and driver boards 141, 142, 143, and 144.

Yet, in the present specification, the main board 110 and the timing controller board 120 are exemplified for convenience of explanation, which is also applicable to any type of display modules related to display control.

That is, the main board 110 described in the present specification corresponds to a first display module for example, the timing controller board 120 corresponds to a second display module, and the scope of a right of the present disclosure should be determined according to the matters described in the claims, which is apparent to those skilled in the art.

The main board 110 may process image data input to the image processing device 100 according to various image processing processes, and output the processed image data to the timing controller board 120. The types of the image processing process performed in the main board 110 are non-limited, and for example, may include demultiplexing of dividing an input transmission stream into sub-streams of an image signal, an audio signal, and additional data, decoding of an image signal, scaling of adjusting an image signal to a preset resolution, noise reduction for improving image quality, detail enhancement, frame refresh rate conversion, and the like. In addition to such an image processing process, the main board 110 may perform various processes according to types and characteristics of data.

The timing controller board 120, simply referred to as a T-con board, adjusts the amount of data transmitted to the driver boards 141, 142, 143, and 144, and controls the driver chips constituting the driver boards 141, 142, 143, and 144, respectively. The timing controller board 120 transmits the image data received from the main board 110 to the driver chip of each of the driver boards 141, 142, 143, and 144. The timing controller board 120 controls the driver boards 141, 142, 143, and 144 to adjust the timing of applying the image data for each channel of a display panel (not shown).

The timing controller board 120 generates a control signal for controlling the driver board by receiving not only image data but also various timing signals including a vertical synchronization signal Vsync, a horizontal synchronization signal Hsync, and a Data Enable (DE) signal.

The power supply unit 130 supplies power to the timing controller board 120. Of course, the power supply unit 130 may supply power to other components as needed.

The driver boards 141, 142, 143, and 144 are disposed along the edges of the display panel to implement an image on the display panel by applying driving signals in pixel units to the display panel.

Although FIG. 1 illustrates that the driver boards include four boards 141, 142, 143, and 144, the present disclosure is non-limited thereto. In consideration of the size and/or resolution of the display panel connected to the image processing device, the driver boards may include a single board only or more or less than four boards.

In addition, in FIG. 1, four driver chips 141-1 to 141-4, 142-1 to 142-4, 143-1 to 143-4, or 144-1 to 144-4 are illustrated as provided to each board, but fewer or more driver chips may be provided thereto.

Figure 2:
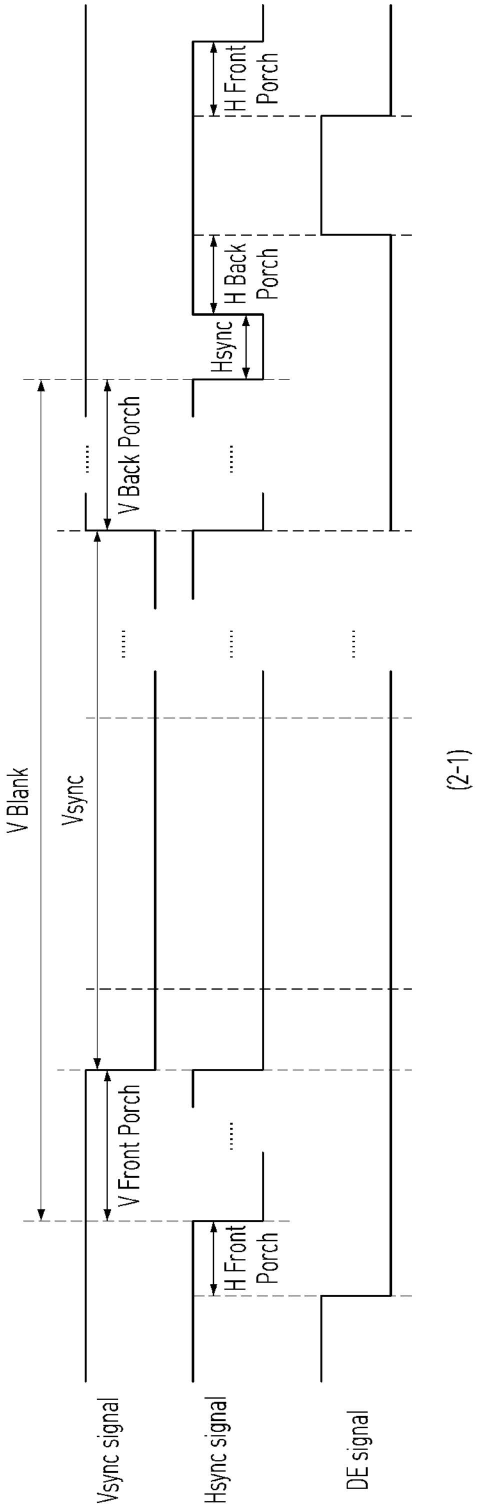
FIG. 2 shows a diagram (2-1) and a table (2-2), illustrating display timing according to Ultra High Definition (UHD) resolution.

FIG. 2 illustrates display timing according to Ultra High Definition (UHD) resolution.

Hereinafter, the timing relationship among a vertical synchronization signal (Vsync signal), a horizontal synchronization signal (Hsync signal), and a data enable signal (DE signal) will be described with reference to FIG. 2.

As shown in FIG. 2 (2-1), the vertical synchronization signal (Vsync signal) includes a vertical synchronization period Vsync of a low logic, a vertical front porch period V Front Porch before the vertical synchronization period Vsync, and a vertical back porch period V Back Porch after the vertical synchronization period Vsync. The vertical synchronization period Vsync, the vertical front porch period V Front Porch, and the vertical back porch period V Back Porch may be defined as a vertical blanking period Vblank.

The horizontal synchronization signal (Hsync signal) includes a horizontal synchronization period Hsync of the low logic and a horizontal front porch period H Front Porch before and after the horizontal synchronization period Hsync, and a horizontal back porch period H Back Porch after the horizontal synchronization period Hsync. The horizontal synchronization period Hsync, the horizontal front porch period H Front Porch, and the horizontal back porch period V Back Porch may be defined as a horizontal blanking period Hblank.

The data enable signal DE becomes a high logic in a period failing to belong to any one of the vertical blanking period Vblank and the horizontal blanking period Hblank, and becomes a low logic in a period n belonging to any one of the vertical blanking period Vblank and the horizontal blanking period Hblank. The data enable signal (DE signal) is synchronized with the inputted image data so that the image data is displayed in a prescribed active area.

The detailed timing relationship of the above periods in Ultra High Definition (UHD) resolution is summarized in the table of FIG. 2 (2-2).

When a transmission interface type m of image data in the image processing device 100 follows the V-by-One (Vx1) standard, a control (CTL) field frame may be transmitted during the vertical synchronization period Vsync. A signal for identifying the start and transmission of data transmission, a signal for controlling a transmission speed, a signal for detecting an error in data transmission, and the like may be transmitted through the control field frame. The transmission timing of the control field frame will be described in more detail later with reference to FIG. 3.

Figure 3:
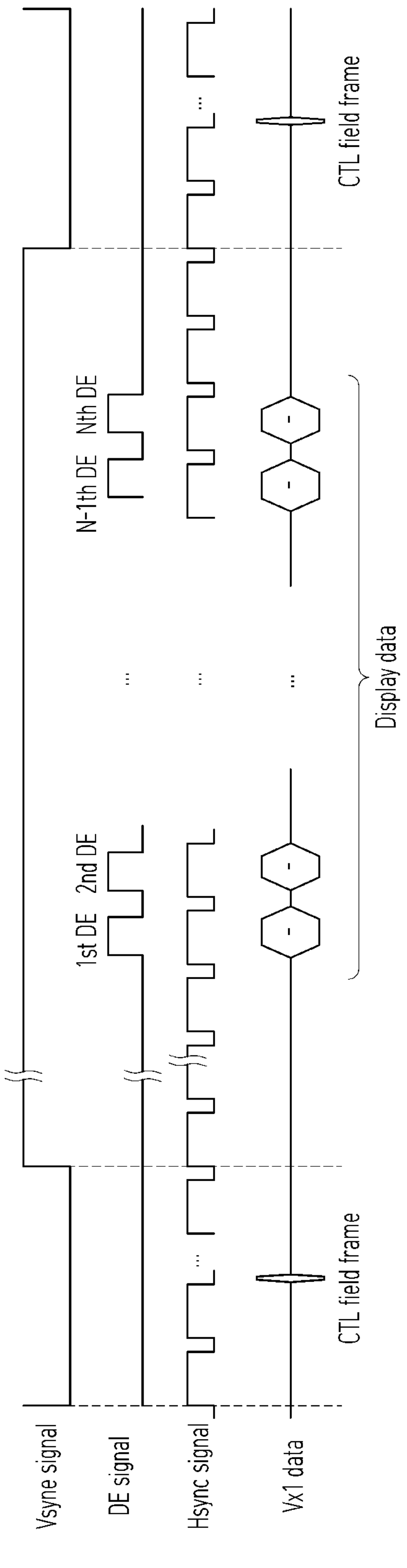
FIG. 3 is a diagram illustrating transmission timing of a control field frame according to a V-by-One (Vx1) specification.

FIG. 3 shows the transmission timing of the control field frame according to the V-by-One (Vx1) standard.

The control field frame may be transmitted when the vertical synchronization signal (Vsync signal), the horizontal synchronization signal (Hsync signal), and the data enable signal (DE signal) all have the low logic. Although not shown, in some cases, the control field frame may be transmitted when the vertical synchronization signal (Vsync signal) and the horizontal synchronization signal (Hsync signal) have the low logic and the data enable signal (DE signal) has the high logic.

Meanwhile, an Average Picture Level (APL) of image data may be transmitted through the control field frame. The APL is an average screen level, and when a 10-bit image is described as an example, black becomes 0 and full white becomes 1023, which means an average value of image data of all pixels in one frame.

The APL may be particularly useful in power control of an Organic Light Emitting Diode (OLED) type display that uses an element capable of spontaneous emission without a separate backlight.

The relationship between the APL and the display brightness will be described with reference to FIG. 4 and FIG. 5.

Figure 4:
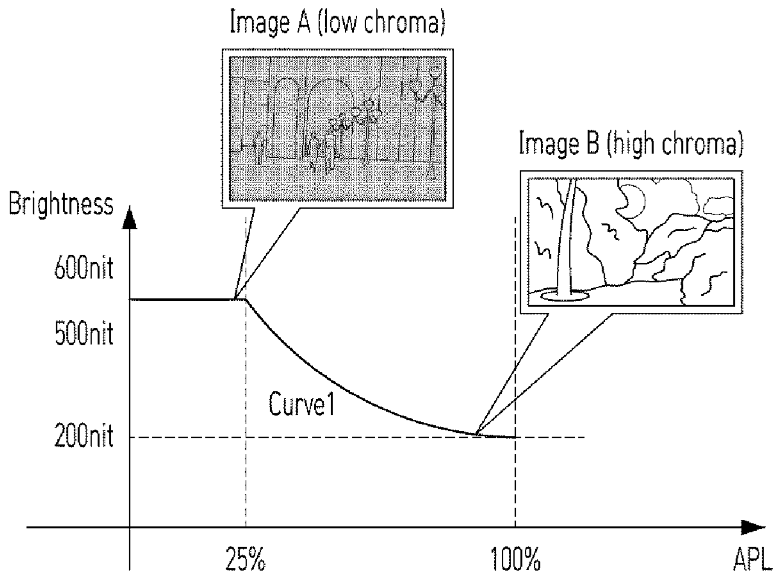
FIG. 4 and FIG. 5 are diagrams illustrating the relationship between APL and display brightness.
Figure 5:
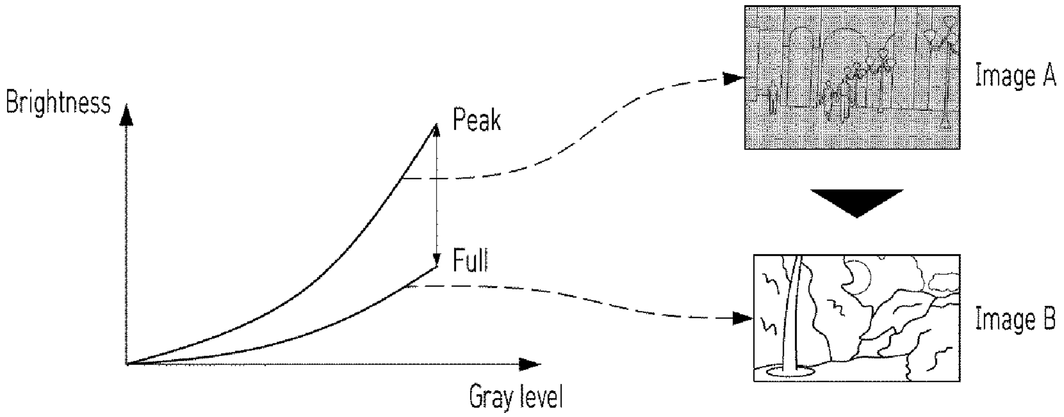

FIG. 4 and FIG. 5 show a relationship between APL and display brightness.

As shown in FIG. 4, images with different APLs may be displayed with different display brightness to increase expressive power or vitality. For example, a first image A having a low APL may be controlled to be displayed with high display brightness. This is to allow a fine bright and dark difference in a dark image to be expressed more sensibly. In addition, a second image B having a high APL may be controlled to be displayed with low display brightness. This is to prevent a bright image from being displayed by being saturated.

Yet, since the first image A with the low APL is being displayed, if the first image A rapidly changes to the second image B with the high APL while the first image A is being outputted by increasing the display brightness, a considerable portion of a display panel may be instantly peak-driven, and in this case, overcurrent occurs to cause power shutdown.

To prevent this, a frame memory (e.g., a volatile memory) for temporarily storing an image received from the image processing device may be separately provided in the display device (not shown), an APL of the image stored in the frame memory may be calculated, and then the image stored in the frame memory may be displayed on the display device according to the calculated APL. However, in this case, since a separate frame memory is required to be provided in the display device, this may increase the manufacturing cost of the display device.

Therefore, if the image processing device 100 can obtain an APL of the image data in advance, when the image data is processed and transmitted to the display device, the APL is transmitted together. Hence, when each frame of the image data is displayed on the display device, it may be able to consider that the corresponding APL of each frame can be immediately reflected in the display brightness. The APL may be received by the image processing device 100 from an image data source (e.g., an RF antenna, a set-top box, an image player, etc.).

Hereinafter, it will be described that APL data is transmitted together through the control field frame when image data is transmitted according to the Vx1 (V-by-One) standard.

Yet, the scope of the right of the present disclosure should be determined according to the matters described in the claims, and for convenience of explanation, the Vx1 standard will be exemplarily described.

Figure 6:
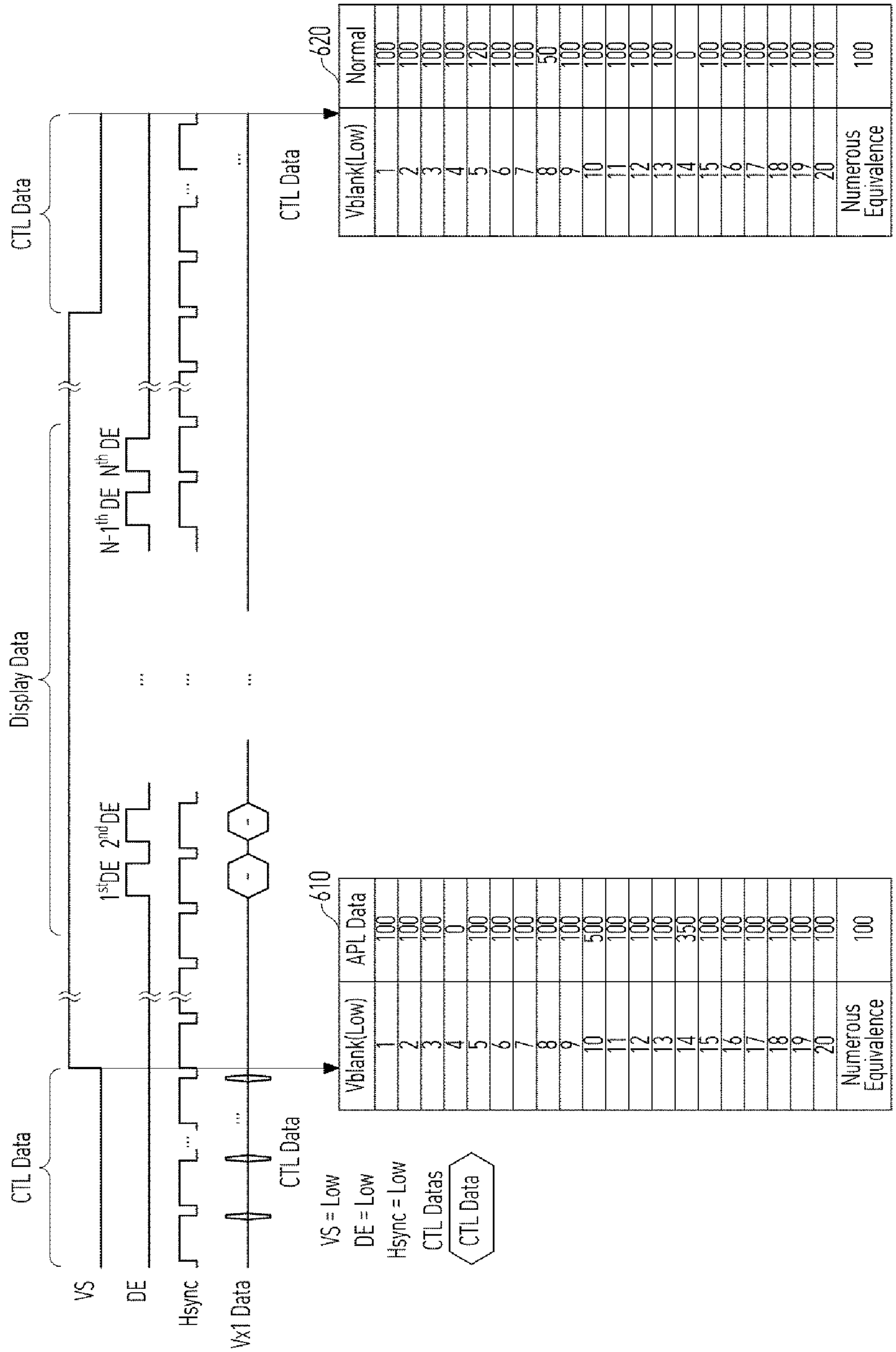
FIG. 6 is a diagram illustrating a specific period for generating APL data and a specific timing point of transmitting the APL data according to one embodiment of the present disclosure.

FIG. 6 is a diagram illustrating a specific period for generating APL data and a specific timing point of transmitting APL data according to one embodiment of the present disclosure.

According to the conventional technology such as Vx1, etc., Control (CTL) data is to be transmitted once for a random period, but there is a problem that a transmission timing point is not clearly determined. In particular, when transmitting an APL value loaded on the CTL data, an error may occur. Yet, no solution for solving the error has been presented at all. The problems of the related art will be described in more detail in FIG. 7 below.

According to one embodiment of the present disclosure, as shown in FIG. 6, APL values are loaded on a plurality of CTL data in a specific period per frame and transmitted, and an APL value with most numerous equivalence is designed to be restored. Such a technology may also be referred to as Numerous Equivalence CTL reception/recovery technology.

More specifically described as follows.

First, it is assumed that a V blank low period is entered.

Second, it is designed to deliver CTL data (for example, a specific APL value) in a H low period and a DE low period.

Third, it is designed to continue to deliver CTL data (e.g., a specific APL value) for each repeated H low period and each repeated DE low period.

Fourth, at the timing point of Vsync rising, accumulated CTL data (e.g., a plurality of e APL values) 610 and 620 are generated in a table format.

Finally, fifth, CTL data is confirmed as the same APL value with most numerous equivalence.

When designed in this way, provided is an algorithm that adopts data with secured identity by receiving multiple same CTL data even in the existing Vx1 lossy compression structure. Therefore, there is a technical effect that it is possible to implement OLED panel current driving with a parameter stably matched between an image and an APL on current driving of a panel.

FIG. 7 is a diagram illustrating a problem in case of transmitting APL data according to the related art.

First of all, let us assume that the case of normally transmitting and receiving "100" as an APL value is normal.

However, according to the Vx1 protocol of the related art, even if an APL value is not 100 once, there is a problem of applying it as it is.

For example, if an APL value of a count '2' 710 is transmitted as '0', a receiving device (or panel, board, etc.) directly applies the APL value as "0" as it is. Therefore, an error occurs in APL restoration data according to the data error occurrence.

As another example, if an APL value of a count '3' 720 is transmitted as '0', the receiving device (or panel, board, etc.) directly applies the APL value as "0" as it is. Therefore, an error occurs in the APL restoration data according to the data error occurrence.

As another example, if an APL value of a count '7' 730 is transmitted as '0', the receiving device (or panel, board, etc.) directly applies the APL value as "0" as it is. Therefore, an error occurs in the APL restoration data according to the data error occurrence.

As another example, if an APL value of a count '11' 740 is transmitted as '400', the receiving device (or panel, board, etc.) directly applies the APL value as "400" as it is.

Therefore, an error occurs in the APL restoration data according to the data error occurrence.

As another example, if an APL value of a count '14' 750 is transmitted as '300', the receiving device (or panel, board, etc.) directly applies the APL value to "300" as it is. Therefore, an error occurs in the APL restoration data according to the data error occurrence.

As further example, if an APL value of a count '16' 760 is transmitted as '512', the receiving device (or a panel, a board, etc.) directly applies the APL value as 512 as it is. Therefore, an error occurs in the APL restoration data according to the data error occurrence.

As another further example, if an APL value of a count '17' 770 is transmitted as '512', the receiving device (or a panel, a board, etc.) directly applies the APL value as "512" as it is. Therefore, an error occurs in the APL restoration data according to the data error occurrence.

FIG. 8 is a diagram illustrating a technical effect when APL data is transmitted according to an embodiment of the present disclosure.

In order to solve the above-described problem of FIG. 7, according to one embodiment of the present disclosure, as shown in FIG. 8, a plurality of APL values are designed to be loaded on CTL data and transmitted during a vertical blank period. Moreover, it is designed to finally apply an APL value with most numerous equivalence among a plurality of APL values.

The application of the two kinds of more specific embodiments related to this also falls within the scope of the right of the present disclosure.

First, as illustrated in FIG. 8 (*a*), a plurality of APL values may be transmitted during a vertical blank period in one frame, and an average value 810 may be determined as a final APL value. In this case, the possibility of error may be drastically reduced compared to the aforementioned related art shown in FIG. 7.

However, the possibility of slight error occurrence compared to the initially intended APL value of "100" cannot be ruled out.

In order to overcome such limitation, as shown in FIG. 8 (*b*), a plurality of APL values may be transmitted during a vertical blank period in one frame, and the most numerous APL value 820 may be determined as a final APL value. When designed in this way, there is a technical effect in that the possibility of error occurrence converges to almost zero.

Figure 9:
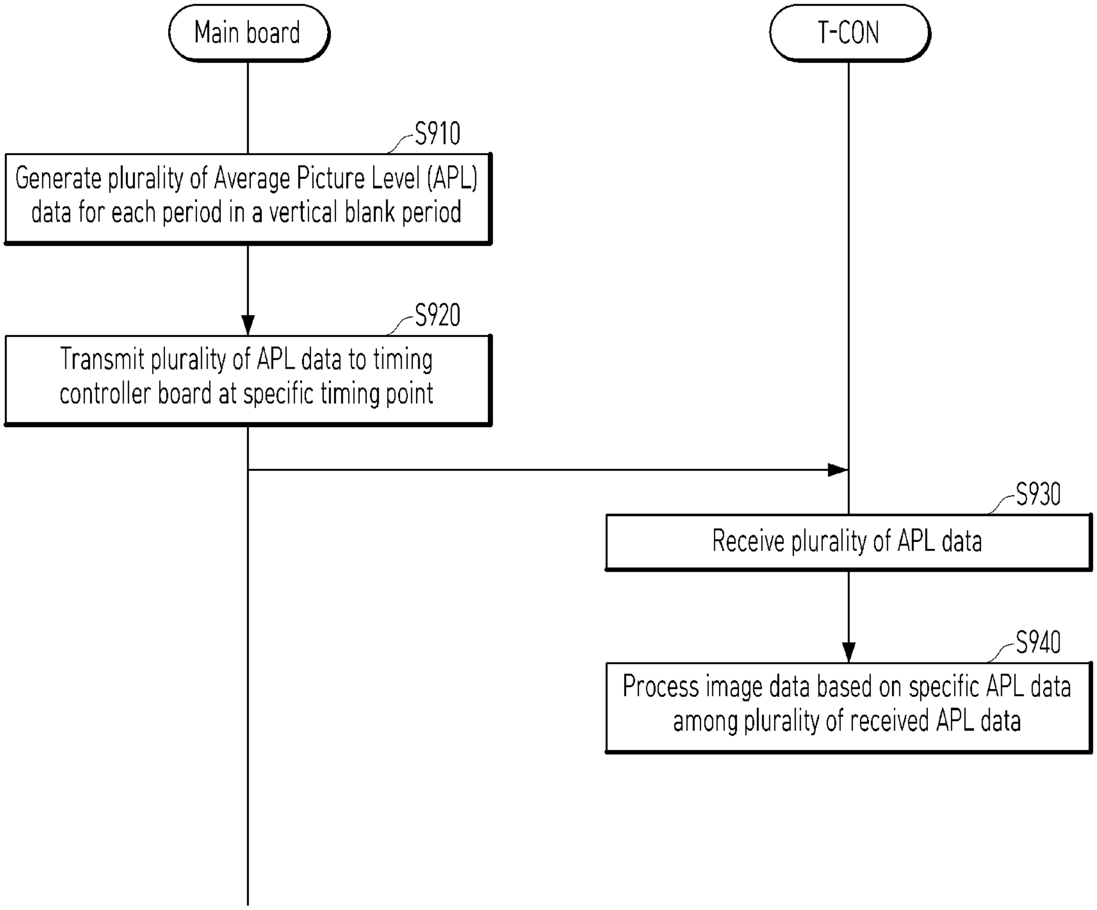
FIG. 9 is a flowchart illustrating a process for transmitting APL data by a main board and receiving it by a T-CON board according to one embodiment of the present disclosure.

FIG. 9 is a flowchart illustrating a process for transmitting APL data by a main board and receiving it by a T-CON board according to an embodiment of the present disclosure.

Both a main board and a timing controller (T-CON) board illustrated in FIG. 9 may be included in a display device. According to one embodiment of the present disclosure, the operation and order of each subject are defined in more detail.

First of all, the main board generates a plurality of Average Picture Level (APL) data for each specific period within a vertical blank period (S910).

Subsequently, the main board transmits a plurality of the APL data to the timing controller board at a specific timing point (S920).

The timing controller (T-CON) board receives a plurality of the APL data described above from the main board (S930).

In addition, the timing controller (T-CON) board is designed to process image data based on a specific APL data among a plurality of the received APL data (S940).

The specific period described in the step S910 includes, for example, a case of satisfying all of a first condition in which a vertical synchronization signal Vsync is in a low state, a second condition in which a horizontal synchronization signal Hsync is in a low state, and a third condition in which a data enable signal DE is in a low state.

The specific timing point described in the step S920 is, for example, a timing point at which the vertical synchronization signal Vsync.rises.

Furthermore, as another embodiment, the transmitting step S920 may be designed to increase data transmission efficiency by transmitting a plurality of the APL data once in a table format.

In addition, as another embodiment, the processing step S940 further includes comparing a plurality of the received APL data and selecting a specific APL data having most numerous equivalence. In this regard, as sufficiently described in FIG. 8 (*b*), the same description may be repeated by those skilled in the art even if the same description is omitted.

On the other hand, no limitation is put on the display device including the main board and the timing controller (T-CON) board illustrated in FIG. 9, but the Vx1 (V-by-One) standard may be followed for example.

Figure 10:
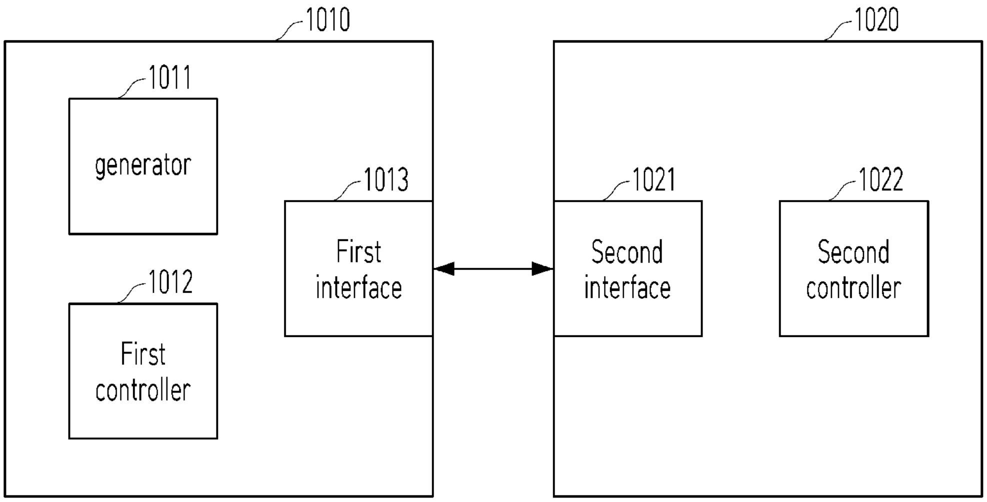
FIG. 10 is a block diagram schematically illustrating a main board and a T-CON board according to one embodiment of the present disclosure.

FIG. 10 is a block diagram schematically showing a main board and a T-CON board according to one embodiment of the present disclosure.

The present disclosure may be implemented in a display device including both of the main board and the T-CON board shown in FIG. 9, but may also be implemented in each of the main board and the T-CON board.

As shown in FIG. 10, a main board 1010 for processing image data according to one embodiment of the present disclosure includes a generator 1011, a first controller 1012, and a first interface 1013. Each of the components may be implemented in software, hardware, or circuitry.

The first interface 1013 performs a function for connecting to the timing controller board 1020.

The generator 1011 generates a plurality of Average Picture Level (APL) data for each specific period within a vertical blank period.

In addition, the first controller 1012 controls the first interface 1013 to transmit a plurality of the APL data to the timing controller board 1020 at a specific timing point.

The specific period is designed to include, for example, a first condition in which a vertical synchronization signal Vsync is in a low state, a second condition in which a horizontal synchronization signal Hsync is in a low state, and a third condition in which a data enable signal DE is in a low state.

The specific timing point is, for example, a timing point at which the vertical synchronization signal Vsync rises.

The first controller 1012 is characterized in controlling the interface to transmit a plurality of the APL data once in a table format, for example.

As shown in FIG. 10, a timing controller board 1020 for processing image data according to one embodiment of the present disclosure includes a second controller 1022 and a second interface 1021. Each of the components may be implemented in software, hardware or circuit.

The second interface 1021 receives a plurality of the APL data from the main board 1010.

The second controller 1022 processes image data based on a specific APL data among a plurality of the received APL data.

Furthermore, the second controller 1022 is characterized in comparing a plurality of the received APL data and selecting a specific APL data with the most numerous equivalence. In this regard, as sufficiently described in FIG.

8 (*b*), even if the same description is omitted, it is possible for those skilled in the art to repeatedly embody it.

And, as described above, a plurality of the APL data are characterized in being generated by the main board 1010 when the first condition in which the vertical synchronization signal Vsync is in the low state, the second condition in which the horizontal synchronization signal Hsync is in the low state, and the third condition in which the data enable signal DE is in the low state are satisfied within the vertical blank period.

It will be appreciated by those skilled in the art to which the present disclosure belongs that the disclosure described above may be practiced in other specific forms without altering its technical ideas or essential features.

For example, an image processing device according to the present disclosure may be implemented in the form of an IC for each component or a combination of two or more components, and the function of the image processing device may be implemented in the form of a program and installed on the IC. When the function of the image processing device according to the present disclosure is implemented as a program, the function of each component included in the image processing device may be implemented as a specific code, and codes for implementing a specific function may be implemented as one program or may be implemented by being divided into a plurality of programs.

It should therefore be understood that the embodiments described above are exemplary and non-limiting in all respects. The scope of the present disclosure is defined by the appended claims, rather than by the detailed description above, and should be construed to cover all modifications or variations derived from the meaning and scope of the appended claims and the equivalents thereof.

What is claimed is:

1. A method of controlling a display device, the method comprising:

generating a plurality of Average Picture Level (APL) data for each specific period within a vertical blank period by a first display module;

transmitting the plurality of the APL data to a second display module at a specific timing point by the first display module;

receiving the plurality of the APL data by the second display module; and processing image data by the second display module based on a specific APL data among the plurality of the received APL data, wherein the second display module receives timing signals including a vertical synchronization signal and a horizontal synchronization signal, and wherein a control field frame is transmitted during a period in which both of the vertical synchronization signal and the horizontal synchronization signal have a low state.

2. The method of claim 1, wherein a specific period includes a case of satisfying a first condition that the vertical synchronization signal is in the low state.

3. The method of claim 2, wherein the specific period includes a case of satisfying the first condition and a second condition that the horizontal synchronization signal is in the low state.

4. The method of claim 3, wherein the specific period includes a case of satisfying the first condition, the second condition, and a third condition that a data enable signal is in the low state.

5. The method of claim 4, wherein the specific timing point comprises a timing point at which the vertical synchronization signal rises.

6. The method of claim 5, the transmitting comprises transmitting the plurality of the APL data once in a table format.

7. The method of claim 6, the processing further comprising:

comparing a plurality of the received APL data.

8. The method of claim 7, the processing further comprising:

selecting the specific APL data with most numerous equivalence.

9. The method of claim 1, wherein the display device is driven according to a serial interface system.

10. The method of claim 1, wherein the display device includes at least one of a main board or a timing controller.

11. A first display module for processing image data, the first display module comprising:

an interface configured to connect to a second display module;

a generator configured to generate a plurality of Average Picture Level (APL) data for each specific period within a vertical blank period;

a controller configured to control the interface to transmit the plurality of the APL data to a timing controller board at a specific timing point, wherein the first display module is configured to transmit timing signals including a vertical synchronization signal and a horizontal synchronization signal, and wherein a control field frame is configured to be transmitted during a period in which both of the vertical synchronization signal and the horizontal synchronization signal have a low state.

12. The first display module of claim 11, wherein a specific period includes a case of satisfying a first condition that the vertical synchronization signal is in the low state.

13. The first display module of claim 12, wherein the specific period includes a case of satisfying the first condition and a second condition that horizontal synchronization signal is in the low state.

14. The first display module of claim 13, wherein the specific period includes a case of satisfying the first condition, the second condition, and a third condition that a data enable signal is in the low state.

15. The first display module of claim 14, wherein the specific timing point comprises a timing point at which the vertical synchronization signal rises.

16. The first display module of claim 15, the controller controls the interface to transmit the plurality of the APL data once in a table format.

17. The first display module of claim 16, wherein the controller is further configured to compare a plurality of received APL data.

18. The first display module of claim 17, wherein the controller is further configured to select specific APL data with most numerous equivalence.

19. The first display module of claim 11, wherein the second display module is driven according to a serial interface system.

20. The first display module of claim 11, wherein the first display module includes at least one of a main board or a timing controller.

21. The method of claim 1, wherein the control field frame includes a signal for identifying a start and transmission of data transmission, a signal for controlling a transmission speed, and a signal for detecting an error in the data transmission.

22. The first display module of claim 11, wherein the control field frame includes a signal for identifying a start and transmission of data transmission, a signal for controlling a transmission speed, and a signal for detecting an error in the data transmission.

* * * * *